United States Patent
Angenendt et al.

(10) Patent No.: US 8,968,464 B2
(45) Date of Patent: Mar. 3, 2015

(54) PLASTIC REFRACTORY MATERIAL AND REFRACTORY MORTAR

(75) Inventors: Rainer Angenendt, Xanten (DE); Peer Genth, Rangsdorf (DE)

(73) Assignee: TDH-GmbH Technischer Daemmstoffhandel, Hamburg (DE)

(*) Notice: Subject to any disclaimer, the term of this patent is extended or adjusted under 35 U.S.C. 154(b) by 118 days.

(21) Appl. No.: 13/579,288

(22) PCT Filed: Feb. 23, 2011

(86) PCT No.: PCT/EP2011/000869
§ 371 (c)(1),
(2), (4) Date: Sep. 13, 2012

(87) PCT Pub. No.: WO2011/104005
PCT Pub. Date: Sep. 1, 2011

(65) Prior Publication Data
US 2013/0062549 A1    Mar. 14, 2013

(30) Foreign Application Priority Data
Feb. 24, 2010 (DE) .................. 10 2010 009 146

(51) Int. Cl.
*C04B 28/24* (2006.01)
*C04B 35/66* (2006.01)
(Continued)

(52) U.S. Cl.
CPC ............. *C04B 28/003* (2013.01); *C04B 28/24* (2013.01); *C04B 35/63424* (2013.01); *C04B 35/66* (2013.01); *C04B 35/82* (2013.01); *C04B 2111/28* (2013.01); *C04B 2235/3418* (2013.01); *C04B 2235/3454* (2013.01); *C04B 2235/349* (2013.01);
(Continued)

(58) Field of Classification Search
CPC ...................................... C04B 28/003
See application file for complete search history.

(56) References Cited

U.S. PATENT DOCUMENTS 3,961,978 A * 6/1976 Brodmann ............... 106/409
4,151,154 A * 4/1979 Berger ..................... 523/203
(Continued)

FOREIGN PATENT DOCUMENTS

CN   1995246 A * 7/2007
DE   4439428 A1 * 5/1996
(Continued)

OTHER PUBLICATIONS

Anti-aging for Facades. BASF. Mar. 8, 2010.*
(Continued)

*Primary Examiner* — Robert C Boyle
*Assistant Examiner* — Stephen Rieth
(74) *Attorney, Agent, or Firm* — Lucas & Mercanti, LLP; Jonathan Myers

(57) ABSTRACT

A plastic refractory material or a refractory mortar which harden when dried and which contain at least one light-weight filler, a binder, fibers and/or wollastonite as well as water is characterized in that blown closed-cell volcanic ash is used as the light-weight filler, the ash being provided with a superficial water-protection layer, in that an inorganic-organic hybrid binder is used as the binder, the binder containing silicic acid and an organic polymer, and in that the material or the mortar contains kaolin or kaolinite and silicon dioxide.

It is suggested to publish the abstract without a drawing.

7 Claims, 1 Drawing Sheet

(51) Int. Cl.
*C04B 14/10* (2006.01)
*C04B 14/16* (2006.01)
*C04B 14/38* (2006.01)
*C04B 20/10* (2006.01)
*C04B 28/00* (2006.01)
*C04B 35/634* (2006.01)
*C04B 35/82* (2006.01)
*C08K 3/36* (2006.01)
*C04B 111/28* (2006.01)

(52) U.S. Cl.
CPC ..... *C04B 2235/36* (2013.01); *C04B 2235/5224* (2013.01); *C04B 2235/5232* (2013.01); *C04B 2235/5244* (2013.01); *C04B 2235/5248* (2013.01)
USPC ........... 106/708; 106/698; 106/705; 106/711; 524/493

(56) References Cited

U.S. PATENT DOCUMENTS

| | | | |
|---|---|---|---|
| 4,446,040 A | | 5/1984 | Samanta |
| 4,525,388 A | * | 6/1985 | Rehder et al. ................. 427/221 |
| 4,664,712 A | | 5/1987 | Cisneros |
| 6,866,709 B1 | * | 3/2005 | Holbek ........................ 106/38.3 |
| 2002/0117087 A1 | | 8/2002 | Klus |
| 2007/0082190 A1 | * | 4/2007 | Endres et al. ............... 428/312.2 |
| 2009/0318598 A1 | * | 12/2009 | Perez et al. ................... 524/261 |

FOREIGN PATENT DOCUMENTS

DE 102004020889 A 11/2005
DE 102007012489 A 9/2008

OTHER PUBLICATIONS

Water-Based Nanocomposites. BASF. 2008.*
Col. 9 MDDS. BASF. Jul. 8, 2009.*
Definition of silicic acid. http://dictionary.reference.com/browse/silicic+acid. As viewed on Mar. 21, 2014.*
Machine Translation of CN1995246A. Jul. 11, 2007.*
Machine Translation of DE4439428 A1. May 9, 1996.*
Ludox AM information. Aldrich chemical. http://www.sigmaaldrich.com/catalog/product/aldrich/420875?lang=en&region=US. As viewed on Mar. 6, 2014.*
Definition of embed. http://dictionary.reference.com/browse/embed. As viewed on Jul. 18, 2014.*
Definition of compound. http://dictionary.reference.com/browse/compound. As viewed on Jul. 18, 2014.*

* cited by examiner

PLASTIC REFRACTORY MATERIAL AND REFRACTORY MORTAR

CROSS REFERENCE TO RELATED APPLICATIONS

This application is the US-national stage of PCT application PCT/EP2011/000869 filed 23 Feb. 2011, published 9 Jan. 2011 as WO2011/104005, and claiming the priority of German patent application 102010009146.4 itself filed 24 Feb. 2010, whose entire disclosures are herewith incorporated by reference.

FIELD OF THE INVENTION

The invention relates to a plastic refractory material and refractory mortar that harden when dried and which contain at least one lightweight filler, a binder, fibers and/or wollastonite as well as water, for applications up to about 1000° C.

The term lightweight fillers is used here to refer to low-density mineral granulates with high melting point, for example blown volcanic ash, expanded perlite and similar.

PRIOR ART

Mortar mixtures containing fibers and lightweight fillers for manufacturing and repairing refractory molded parts are known. Known mortars as well as plastic materials for temperatures up to 1000° C. and higher have considerably higher densities and shrink when they are dried, and this may give rise to the formation of fine cracks.

Insulation Materials for Transport Ladles for Liquid Metal in Foundry Technology According to the Prior Art Businesses that recycle scrap aluminum process the materials they receive to obtain various products including aluminum casting alloys that conform to precise specifications on the part of their customers. Some of the delivery is made in molten form. After all components have been melted and mixed, the aluminum is poured into special transport ladles that are insulated to retain heat and delay the hardening (freezing) of the aluminum by several hours.

The requirements regarding precision in the manufacturing and logistics processes are extremely stringent. Depending on the customer's instructions, the alloys may deviate by a tiny amount from the defined properties. Accordingly, all contamination, such as deposits of metal on the inner walls of the ladles must be prevented entirely. Consequently: the ladles are cleaned and maintained at certain intervals and depending on their prior use, which entails enormous expenditure in terms of time, energy and thus also money.

The interior insulation that has been used until now, and covers not only the lid of the transport ladle but also the transport ladle itself, includes a concrete inner shell and rear insulation that must be replaced at least every one to three years for a variety of reasons. Under these conditions of rotating replacement of the concrete insulation, each ladle must be out of service for 3-4 weeks. The maintenance costs associated with the constant and continuous replacement of the ladle interior insulation are substantial.

According to the prior art, a thermal insulation layer in the form of calcium silicate and combinations of calcium silicate with microporous insulating materials is applied between the steel outer jacket and the concrete inner shell. The inner side of the transport ladle's outer jacket is lined with calcium silicate plates, in which case the heat insulating plates should be positioned as closely and as seamlessly flush with each other as possible. Then, liquid concrete is deposited on this thermal insulation layer to form the concrete inner shell. Due to the high temperatures that prevail when the transport ladle is used and the uneven rear insulation, over time the concrete inner shell develops cracks through which the molten aluminum seeps and comes into contact with the thermal insulation layer. Since it is not possible to produce a seamless layer of thermally insulating calcium silicate, the molten aluminum seeps further through the joints between adjacent thermal insulation plates until it reaches the outside. This causes the cracks to become enlarged and the temperature of the outer wall to rise to impermissible levels.

Microporous insulating materials absorb molten aluminum and are destroyed by it.

German patent application DE 10 2007 012 489 A1 only describes insulating and exothermic feeders in foundry technology. Feeder is a term used in foundry technology and it refers to geometrical sprue elements on cast parts in whose mold the cavity volume deficit is to be placed as the cast part solidifies, and which are removed again when the cast parts are cleaned. The feeders themselves are destroyed in this process (disposable parts).

The task of the feeder is to prevent the formation of blow-holes (cavities) in a cast part, and it has various other functions in a casting mold:

Controlling the direction of solidification of the poured melt (directed toward the feeder to the extent possible)

Compensating for the reduction in specific volume of the poured melt during the liquid/solid phase transition Venting the casting mold during the casting process (exception: blind feeders)

"Feeder variants": natural sand feeder, insulating feeder, exothermic feeder: Insulating and/or additional heating the feeders after the casting process enables the feeders to be made smaller, which leads to savings in materials (higher yield of cast parts).

The exothermic feeders described in DE 10 2007 012 489 A1 contain thermite-like mixtures that are extremely dangerous and have caused serious fires in some factories. The thermite reaction is a redox reaction in which aluminum is used as the reducing agent, to reduce iron(III) oxide to iron for example. The mixture is called thermite:

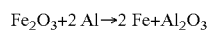
$Fe_2O_3 + 2\,Al \rightarrow 2\,Fe + Al_2O_3$

The reaction products are aluminum oxide and elemental iron. The reaction is violently exothermic, that is to say it generates an enormous amount of heat. Barium peroxide with magnesium is used to start the reaction.

Thermite mixtures are not explosives and can only be made to react (ignition) by applying extreme heat (activation energy). The combustion process is a strongly exothermic reaction (up to 3000° C.). Since firing thermite does not need any external oxygen, the reaction cannot be smothered and can be ignited and will continue to burn in any environment—even under sand or water. Attempts to extinguish it with water and moisture result in a further redox reaction in which the water is reduced by the baser metals, thereby producing metal oxide and hydrogen:

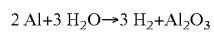
$2\,Al + 3\,H_2O \rightarrow 3\,H_2 + Al_2O_3$

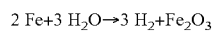
$2\,Fe + 3\,H_2O \rightarrow 3\,H_2 + Fe_2O_3$

The presence of water thus represents a significant danger in the thermite reaction and will result in the explosion-like ejection of molten substances and the formation of explosive hydrogen-oxygen mixtures (oxyhydrogen gas). Thermite mixtures must therefore be stored dry.

The formulations listed in paragraphs [0053] and [0054] in DE 10 2007 012 489 A1 have a water content of about 1.5 to 2.5%. These are therefore powder mixtures that are evidently only produced for the core shooting process.

In the core-shooting machine, molding base material infused with binder is injected into a core mold (the "core box") under a specific shooting pressure and possibly also at a defined working temperature. After the casting core made in this way has been cured or procured, it is fitted into the casting mold. Either "cold box" or "hot box" core-shooting machines are used depending on the binder that is used to cure the mold material.

The mixtures in the present patent application contain significantly more water. The water content in the formulation is at least 10% by weight and higher. The consistency of the mixtures in the present patent application is therefore equivalent to ramming pastes or plastic materials.

The binding agents listed in DE 10 2007 012 489 A1 are all thermoplastics. Thermoplastics, also called plastomers, are plastics that are deformable (thermally plastic) in a certain temperature range. This process is reversible, which is to say it can be repeated as often as desired by cooling and reheating to the molten state, provided the material is not overheated and thermal decomposition is initiated.

Thermoplastics are processed mainly in the injection molding method, which is similar to the core shooting method described in DE 10 2007 012 489 A1. Thermoplastics include such materials as acrylonitrile butadiene styrene (ABS), polyamides (PA), polylactate (PLA), polymethyl methacrylate (PMMA), polycarbonate (PC), polyethylene terephthalate (PET), polyethylene (PE), polypropylene (PP), polystyrene (PS), polyether ether ketone (PEEK) and polyvinyl chloride (PVC). The longest known thermoplastic is celluloid.

The properties of thermoplastic binders are not at all comparable with the hybrid binding agents described in the present patent application, which must guarantee strength over a wide temperature range.

The products described in DE 10 2007 012 489 A1 cannot be fired. They would decompose or ignite with thermite and burn up. Afterward, they could no longer be used.

The emission reduction described in DE 10 2007 012 489 A1 is only carried out to protect the casting mold, not to protect the environment or to avoid fire hazards and the like. However, emissions are considerably higher than in our products. The list of mixtures in DE 10 2007 012 489 A1 only describes refractory cenospheres of $SiO_2$ (these do not exist in fact, however), $Al_2O_3$ (these do not exist with the granularity described) and aluminum silicate, but no fibers and no blown volcanic ash and the like as are presented in the present patent application.

The properties of the products described in DE 10 2007 012 489 A1 render them unusable for the applications described in the present patent application. The invention is therefore not rendered obvious by DE 10 2007 012 489 A1.

OBJECT OF THE INVENTION AND SOLUTION THEREOF

The object of the invention is to develop a plastic refractory material and a refractory mortar of the kind described in the introduction that represent an inexpensive solution for full-coverage filling of areas to be insulated and that exhibit extremely low shrinkage during drying up to the classification temperature of about 1000° C., a gross density of just 200 to 300 kg/m³, and have a classification temperature of about 1000° C. Shrinkage during drying up to a temperature not exceeding 1000° C. should at least be less than 0.5%.

SUMMARY OF THE INVENTION

This object is achieved according to the invention with the refractory plastic material; and the refractory mortar of the kind described in the introduction.

The invention is directed to a plastic refractory material or refractory mortar, which hardens when dried, which comprises:

20 to 40% by weight of a filler comprising blown closed-cell volcanic ash that is furnished with a surface water protection layer, 2 to 8% by weight of a fiber support structure comprising ceramic fibers, mineral fibers having a softening point greater than 950° C. carbon fibers and/or wollastonite.

1 to 6% by weight inorganic-organic hybrid binding agent that comprises compounded nanoparticles 50 to 100 nm in size as a dispersion in water, wherein at least one nanoparticle comprises a plurality of silicic acid particles and an acrylate polymer 3 to 15% by weight of a modified silica comprising a mixture of silicon dioxide, kaolin or kaolinite, and balance water.

The water protection layer increases the stability of the volcanic rock particles in aqueous media and thus also the shelf life of the plastic material or mortar. Further advantages of the plastic refractory material and the refractory mortar will be evident from the description provided later in the present application.

In the present application, the term "finely divided" is used not in the sense of having a given, small grain size, but in the sense of "powdery" or "granular" as opposed to "coarsely divided". Accordingly, the invention does not hinge on a particular grain size or grain size distribution.

In the following, the significance and function of the individual components of the plastic material will be explained. The fiber content serves to hold the material together in the moist state. The hybrid binding agent ensures that the material is held together after drying at temperatures up to about 200° C. by virtue of the organic component and due to the sintering of the silicic acid particles at higher temperatures. The kaolin and silica sol also serve as a binding agent that attains its full function at higher temperatures and the kaolin content of which also serves to seal the plastic material off from molten aluminum in various applications. The lightweight fillers provide the necessary volume and a relatively low gross density compared with the prior art.

The hollow microspheres are surface treated to protect them against attack by water in the plastic materials and mortars, thereby increasing the storage stability of the materials.

The function of lightweight filler is performed by blown cellular volcanic rock in the form of non-porous hollow granulates. If porous hollow granulates were used, they would raise the gross density, more adhesive and more minerals would be required, the plastic materials would be less well defined and thus also more difficult to process, and the porosity of the end product would increase significantly, which would be unfavorable with regard to seepage of the aluminum for example.

According to the invention, after curing the material is extremely stable even at 1000° C., exhibits practically no shrinkage, no internal or external cracks, and no crumbling, and is suitable for prolonged exposure to temperatures up to 1000° C.

Kaolin, also known as china clay or aluminum silicate, is a fine, iron-free, white mineral whose main component is kaolinite, a product of weathering of feldspar.

The kaolin used covers the lightweight filler with the high melting temperature in the manner of film and forms a solid structure even during drying. The strength of the structure its shrinkage at temperatures up to 1000° C. is influenced by the relative proportions of kaolin/silica/silica sol ratio and the distribution thereof.

Another advantage of the mixture of kaolin/silica/silica sol consists in the fact that after curing the substance is hard and mechanically stable.

The high mechanical stability without shrinkage at temperatures above 900° C. is obtained according to the invention by the interaction between the major components
  lightweight filler with high melting point, (T>950° C.)
  kaolin, silica, silica sol
  ceramic or other fibers with high melting point.

It is further suggested to use a binder mixture composed of several binding agents whose binding properties are effective in different temperature ranges.

The innovative nature of the product according to the invention consists particularly in that suitable, complementary binder systems are used, for example the hybrid binder, which crosslink the fiber support structures with the lightweight fillers (blown volcanic rock) even during drying below room temperature sufficiently to fix the structure up to temperatures above 900° C. Above about 900° C. this structure is thus reinforced sufficiently by mineral binders, for example kaolin, which it already contains, plus the silicic acid contained in the hybrid binder, to ensure that no shrinkage takes place at the target application temperatures either.

A particularly innovative feature is that the various binders and the mineral granulate with high melting temperature complement these materials in terms of increased hardness as the temperature rises in such manner that the product obtained is dimensionally stable and weight-constant with variably adjustable structures, densities and strengths up to the maximum application temperature.

A major benefit to customers upon using the products according to the invention consists in that besides the desired objective of creating an efficient high-temperature insulating material the customer may also realize significant financial savings in terms of opportunity costs. These costs are made lower for the customer particularly by the improved energy balance as well as the ecobalance through reduced emissions.

Other important advantages of the products according to the invention:
  Non-combustible
  Lightweight
  High thermal resistance
  Low thermal conductivity
  Good strength properties
  Simple installation and processing
  Many combination options
  Low flue gas generation
  Low odor generation
  Low alkalinity
  Not hygroscopic
  Chemically resistant
  Good electrical insulation properties
  Recyclable
  Can be disposed of in landfills The term perlite is used in the earth sciences to describe an altered (chemically and physically transformed) volcanic glass (obsidian), and therefore it is classified as a mineral. The "perlitic" structure is formed in this case by roughly pea-sized glass beads. Perlite contains up to 2% water and has a density of about 900 to 1000 kg/m$^3$ (bulk density of raw perlite). When it is heated to approximately 800° C. to 1000° C., perlite expands to between fifteen and twenty times its original volume and it then has a bulk density of 50 to 100 kg/m$^3$ and a thermal conductivity of $\lambda$=0.040 to 0.070 W/mK.

These perlites are not usable according to the invention due to their porosity.

On the other hand, volcanic rocks that have been expanded at the microcellular level and manufactured according to new, environmentally compatible and energy-efficient methods yielding properties and technical values that set them apart from the volcanic rocks that have undergone older pore-expanding processes ("expanded perlites") are suitable for the purposes of the invention. Microcellular, expanded volcanic rock is a filler from the group of aluminum silicates and is composed of spherical ("honeycomb structure"), rod-like and flake-like particles, resulting in high packing densities and higher bond strengths than in conventional hollow microspheres due to mechanical and cohesive binding forces. Appropriately selected surface coatings enable an advantageous bond with the inorganic or organic matrix. This results in less shrinkage and better technical properties. Expanded, impregnated perlite is available commercially for example under the trade names NOBLITE® (manufactured by NOBLITE, Route de Claye, F-77181 LE PIN, France) and Technoperl® (manufactured by Europerl Deutschland, D-94032 Passau, Nibelungenplatz 4).

Fibers Used According to the Invention

Ceramic and/or mineral fibers with high melting point and/or organic fibers with high melting point such as carbon fibers are particularly suitable for use. Wollastonite is also possible.

Ceramic fibers or ceramic-based fibers are fibers made from inorganic, non-metallic material. Originally, only polycrystalline inorganic substances were classified as ceramic fibers. Now, however, amorphous fibers have been produced by pyrolysis from various polymers, called precursors, and these are counted as ceramic fibers by virtue of their properties. The best is way to distinguish between these and glass fibers that are also amorphous but are not considered ceramic fibers is on the basis of the production process (glass fibers are made from molten glass, amorphous ceramic fibers are made from polymer precursors by pyrolysis). The ceramic fibers are divided into oxidic and non-oxidic fibers.

Regarding oxidic ceramic fibers, those with a base of aluminum oxide and silicon dioxide in varying proportions, and possibly with additional boron oxide or zirconium oxide are known. Mixed oxide fibers including 85% $Al_2O_3$ and 15% $SiO_2$ are also referred to as mullite fibers. All of these fibers are polycrystalline.

Of the non-oxidic, industrially manufactured fibers (other than carbon fibers) various types of silicon carbide fibers are known. Precursor polymers are almost always "polycarbosilanes". These are polymers of hydrocarbons in which individual carbon atoms have been substituted by silicon atoms, or silanes in which individual silicon atoms have been substituted by carbon atoms. The polymers are crosslinked in a curing process by additives which prevents them from simply evaporating during the pyrolysis that follows spinning and instead transforms them—as in the manufacture of carbon fibers—into an amorphous, usually non-stoichiometric SiC ceramic fiber that still contains free carbon. Special manufacturing methods may also be used to produce extremely finely crystalline and pure SiC fibers with significantly improved high temperature properties.

USE ACCORDING TO THE INVENTION

The mortar mixture according to the invention is preferably used for fire protection and/or heat insulation, particularly as a high-temperature thermal insulator, a filler material for sealing cavities or for filling wall surfaces and/or is insulating locations that are asymmetrical or difficult to reach and/or for thermal insulation and fire-resistant sealing of passthrough openings in firewalls, for example passthroughs for pipes and cables that are exposed to high thermal loads.

Possible fields of application include industrial furnace construction, foundry technology, shipbuilding, industrial power station and plant construction, rail vehicle construction, building engineering, and technical heat insulation.

The plastic material according to the invention is particularly suitable for use in the aluminum transport ladles described in the preceding. The solution according to the invention: The former concrete inner shell and rear insulation of the ladles and ladle lids for transporting molten aluminum are replaced by a continuous, seamless, homogeneous insulation material according to the invention. Since kaolin is a releasing agent for molten aluminum, the kaolin content of the insulating material according to the invention also prevents seepage of molten aluminum.

An enormous variety of application possibilities may be derived from the diverse application and processing capabilities of the mortar mixture according to the invention, and a random, expressly non-exhaustive sample of such applications is listed hereafter:

Cable/pipeline barrier seals,
Joint seals,
Filling in holes and cracks in walls and ceilings,
Fire prevention seals,
Fire dampers,
Firedoors,
Feeders for foundry technology,
Coatings for exhaust systems, heat shields, electronic and electrical devices, motors, ovens and grills,
Insulating/repairing chimneys,
Insulating sockets, ceiling lights, switches, fuse boxes,
Insulating industrial furnace systems and incinerator installations,
Insulating domestic appliances (microwave oven, Ceran hob, baking ovens),
Wall and ceiling coatings
Transport ladles,
Sprayed rendering on reinforced concrete constructions,
Sprayed cladding

USE OF THE HYBRID BINDER ACCORDING TO THE INVENTION

The hybrid organic-inorganic binder used is preferably one such as it is manufactured by BASF and available under the trade name of COL.9. It contains compounded particles between 50 and 100 nm in size that contain amorphous silicic acid particles 5 and a polymer 6 with an n-butyl acrylate and methyl methacrylate base (see FIG. 2). The particles are dispersed in water. The adhesiveness of the particles due to their polymer content results in an excellent binder for low temperatures, up to about 200° C. At higher temperatures, the polymer fraction decomposes and the silicic acid particles remain to maintain the structure, in which case the silicic acid particles also form a solid framework at a correspondingly high temperature. Consequently, shrinkage cannot occur either at low or high temperatures. The binder has a solids content of approximately 35 to 40% by weight. The silicate fraction constitutes between 30 and 50% by weight of the solids content.

USE OF SILICA ACCORDING TO THE INVENTION

The silica used is preferably surface-treated. The term silica is understood to mean an intimate mixture of finely particulate silicic acid and kaolinite. For example, Neuburg silica is known, and is used for preference according to the invention. The silica may be treated with a silane so that the individual particles are given a functionally hydrophilic surface to improve its wettability.

A silica that has been activated in this way is commercially available under the trade name "AKTISIL EM", manufactured by Hoffmann Mineral GmbH, Neuburg (Donau). In this case, the silica has been treated with 3-epoxy propyloxypropyl trimethoxysilane. This "activated silica" may be used in powder form. According to the invention it is also possible to use a mixture of silicic acid sol and kaolin/kaolinite.

Examples of Production and Exemplary Formulations

All liquid components of the formulation are weighed out precisely and mixed together gently, taking care not to cause foaming. Toothed disc mixers have proven particularly well suited for this task in practice.

The precisely weighed fibers are added to this mixture evenly in small units, shredded by stirring (at low speed) and thoroughly coated with the aqueous solution.

Then, the precisely weighed lightweight fillers and minerals are mixed together in a rotary drum mixer and added to a compulsory mixer (produced for example by BEBA) while stirring the mixture evenly. The two premixtures are then mixed thoroughly with one another by stirring slowly and evenly for about 45 minutes. High shear forces, pressure and friction must be avoided as far as possible so as not to damage the microcellularly expanded volcanic rocks.

The lightweight fillers should be completely wetted and should yield a uniformly loose mortar or plastic mass.

Formulation 1 for 100 kg Mortar

| | |
|---|---|
| Water | 50 kg |
| Mineral wool (e.g. rockwool loose wool) | 5 kg |
| Hybrid binder (COL 9 from BASF) | 5 kg |
| Hydrophobically equipped expanded microcellular volcanic rocks (e.g. Noblite 200 EC) | 30 kg |
| Silica (e.g. Aktisil EM from Hoffmann-Minerals) | 8 kg |
| 2% surfactant solution (e.g. Tegopren 5840 by Evonik) | 2 kg |

Formulation 2 for 100 kg Plastic Material

| | |
|---|---|
| Water | 46 kg |
| Mineral wool (e.g. rockwool loose wool) | 5 kg |

| | |
|---|---|
| Hybrid binder (COL 9 from BASF) | 5 kg |
| Hydrophobically equipped expanded microcellular volcanic rocks | 30 kg |
| Kaolin, e.g. Chinafill 800 from Amberger Kaolinwerke | 6 kg |
| Silica sol (e.g. Levasil 200A/30 from Akzo Nobel Chemicals) | 8 kg |
| 2% surfactant solution (e.g. Tegopren 5840 by Evonik) | 2 kg |

Comparative Tests

Figure 1:
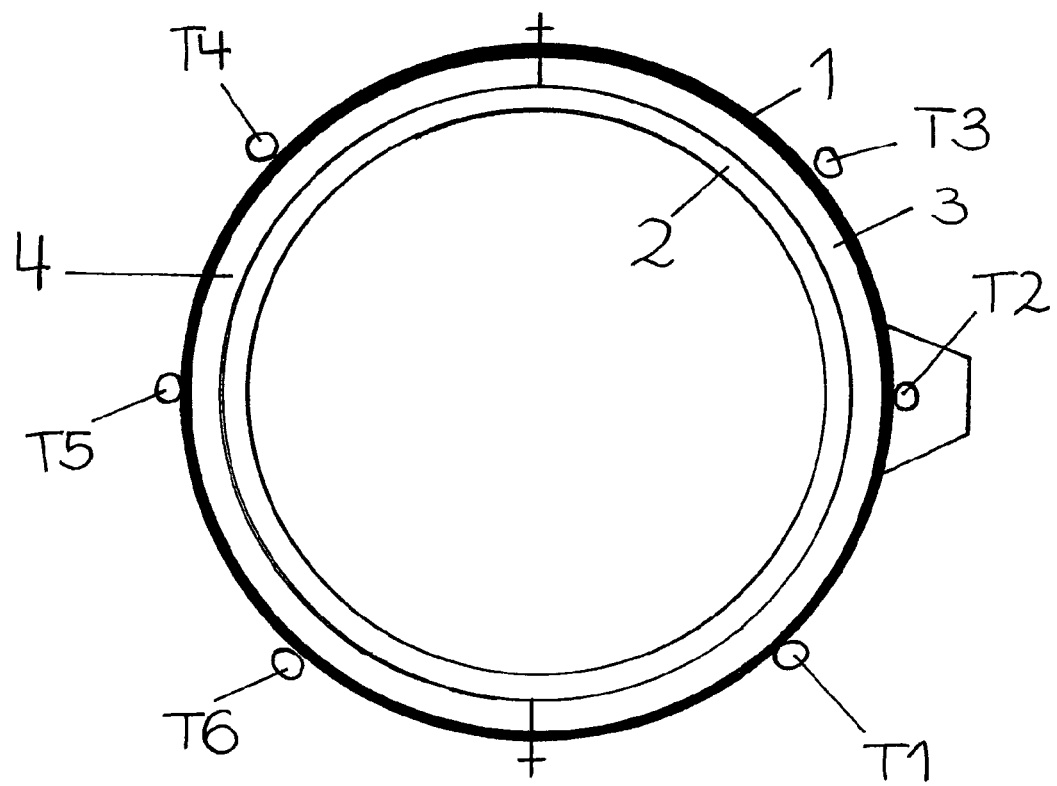
FIG. 1 is a cross sectional view of a ladle used for holding molten aluminum and which is lined with a thermal insulation layer made of the refractory material refractory mortar according to the present invention.
Figure 2:
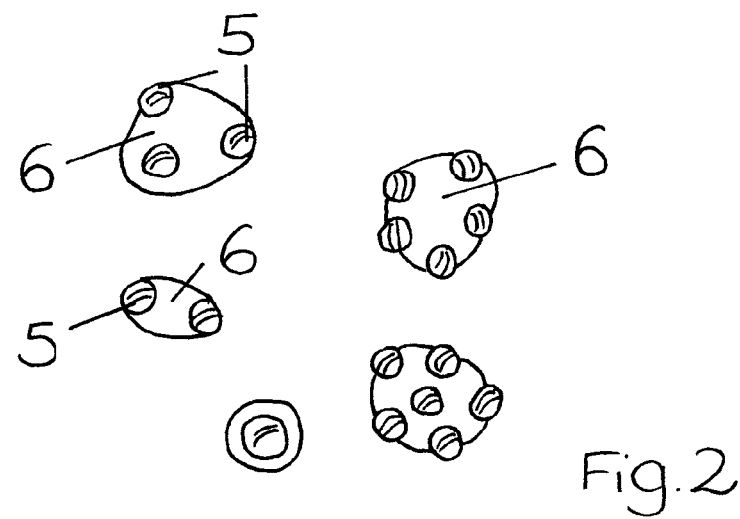
FIG. 2 is an enlarged illustration of the inorganic-organic hybrid binding agent that comprises compounded nanoparticles 50 to 100 nm in size as a dispersion in water, wherein at least one nanoparticle comprises a plurality of silicic acid particles and an acrylate polymer.

Tests with a ladle for molten aluminum yielded significantly better heat insulation when the material according to the invention was used instead of heat insulation with the calcium silicate plates according to the prior art. FIG. 1 shows a cross section through such a ladle. This shows outer jacket 1, which is made from steel, concrete inner shell 2 and thermal insulation layer 3, which is made from the material according to the invention, and thermal insulation layer 4 made from the usual calcium silicate insulation. Designators T1 to T6 represent the temperature measurement points. When the plastic material according to the invention was used, the measured temperatures of outer jacket 1 were about 7° C. cooler than when the known calcium silicate plates 4 were used. Moreover, the seamless processing of the material according to the invention and the predominantly close-celled nature prevents molten aluminum from passing through the insulation to reach outer wall 1.

Other experiments in other ladles for molten aluminum also show the advantage of the material according to the invention. The ladles are significantly less prone to wear than when the conventional insulating material is used. Crack formation in the concrete wearing layer 2 is extremely low, as before.

The invention claimed is:

1. A plastic refractory material or refractory mortar, which hardens when dried which comprises:
    20 to 40% by weight of a filler comprising blown closed-cell volcanic ash that is furnished with a surface water protection layer,
    2 to 8% by weight of a fiber support structure comprising ceramic fibers, mineral fibers having a softening point greater than 950° C., carbon fibers and/or wollastonite,
    1 to 6% by weight inorganic-organic hybrid binding agent that comprises compounded nanoparticles 50 to 100 nm in size as a dispersion in water, wherein at least one nanoparticle comprises a plurality of silicic acid particles and an acrylate polymer.
    3 to 15% by weight of a modified silica comprising a mixture of silicon dioxide, kaolin or kaolinite, and balance water.

2. The plastic refractory material or refractory mortar according to claim 1,
    wherein the silicon dioxide used is in the form of silica sol.

3. The plastic refractory material or refractory mortar according to claim 1,
    wherein the hybrid binder comprises amorphous silicic acid particles, and as the acrylate polymer a polymer of n-butyl acrylate and methyl methacrylate.

4. The plastic refractory material or refractory mortar according to claim 1, wherein the modified silica comprises particles of a mixture of silicic acid-kaolinite whose surface is coated with a wetting agent.

5. The plastic refractory material or refractory mortar according to claim 1,
    wherein a uniform type of mineral fibers or a mixture of different mineral fibers is/are used.

6. A method of insulating an area and of protecting the area from fire which comprises the step of contacting the area to be protected with the plastic refractory material or refractory mortar as defined in claim 1.

7. The method of insulating an area and of protecting the area from fire defined in claim 6 which comprises the step of sealing cavities or filling wall surfaces in the area to be protected with the plastic refractory material or refractory mortar.

* * * * *